UNITED STATES PATENT OFFICE.

ALEXANDRE LEYDET, OF MARSEILLES, FRANCE.

IMPROVEMENT IN BOILER-COVERINGS.

Specification forming part of Letters Patent No. 161,801, dated April 6, 1875; application filed November 6, 1874.

*To all whom it may concern:*

Be it known that I, ALEXANDRE LEYDET, of Marseilles, France, have invented a new and improved composition to be used as a boiler-covering and for other purposes, of which the following is a specification:

This invention relates to an improved composition for coating the surfaces of vessels and pipes which are exposed to the action of frost, to prevent the radiation of heat, economize fuel, reduce the surrounding temperature, and prevent, also, injury by frost.

The following are the ingredients of the composition, with their proportions, although these may be varied according to the more or less plastic nature of the clay or aluminous earths employed: In every one hundred pounds of the composition I use about forty-one pounds of clay or aluminous earth; forty-one pounds of pounded furnace-slag; three pounds of hair; five pounds of broom or other fibrous substance; three pounds of sawdust; five pounds of pulverized charcoal; two pounds of pure glycerine. Total, one hundred pounds. The addition of pounded furnace-slag makes the composition proportionately light, while it possesses the further advantage of being but a poor conductor of heat; and its extreme porosity also enables it to mix intimately with the clay or aluminous earth.

The great superiority of the composition lies in its perfect impermeability, which renders it proof against the effects of moisture, rain, or salt-water.

After having applied the composition before specified, I cover the same with a solution of gutta-percha or india-rubber dissolved, either separately or together, in ether, benzine, spirits of turpentine, or, preferably, in sulphuret of carbon, with which is incorporated silicate of soda, or of potash, or both, in suitable proportions, according to the purpose to which the composition is to be applied. Thus protected the composition will remain intact for an indefinite time under any hygrometric influence whatever.

I claim as my invention—

The combination of the solution of gutta-percha or india-rubber with the composition of glycerine, charcoal, sawdust, broom, hair, powdered furnace-slag, and clay, to be used for the purpose set forth.

ALEXANDRE LEYDET.

Witnesses:
 M. PARCOL,
 E. ALBERT.